United States Patent
Park et al.

(10) Patent No.: US 10,800,106 B2
(45) Date of Patent: Oct. 13, 2020

(54) APPARATUS AND METHOD FOR ESTIMATING MATERIAL USAGE AMOUNT AND PRINTING TIME FOR THREE-DIMENSIONAL PRINTER

(71) Applicant: 3D SYSTEMS KOREA, INC., Gangnam-gu, Seoul (KR)

(72) Inventors: Jae Il Park, Seoul (KR); Gyeo Rye Lee, Busan (KR); Du Su Kim, Yongin-si (KR); Sung Wook Cho, Seoul (KR)

(73) Assignee: 3D Systems Korea, Inc., Soeul (KR)

( * ) Notice: Subject to any disclaimer, the term of this patent is extended or adjusted under 35 U.S.C. 154(b) by 0 days.

(21) Appl. No.: 16/469,059

(22) PCT Filed: Nov. 14, 2017

(86) PCT No.: PCT/KR2017/012898
§ 371 (c)(1),
(2) Date: Jun. 12, 2019

(87) PCT Pub. No.: WO2018/110838
PCT Pub. Date: Jun. 21, 2018

(65) Prior Publication Data
US 2020/0070422 A1 Mar. 5, 2020

(30) Foreign Application Priority Data

Dec. 12, 2016 (KR) .................. 10-2016-0168305
Feb. 28, 2017 (KR) .................. 10-2017-0026393

(51) Int. Cl.
*B29C 64/386* (2017.01)
*B33Y 50/02* (2015.01)
(Continued)

(52) U.S. Cl.
CPC ............ *B29C 64/386* (2017.08); *B33Y 50/02* (2014.12); *B29C 64/20* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

2015/0231824 A1  8/2015  Kobayashi
2016/0092041 A1  3/2016  Pickens
2019/0152155 A1* 5/2019  Gonzalez ............... B33Y 50/02

FOREIGN PATENT DOCUMENTS

WO    2016/165745 A1   10/2016

* cited by examiner

*Primary Examiner* — Ryan A Jarrett
(74) *Attorney, Agent, or Firm* — BakerHostetler

(57) ABSTRACT

A 3D printing estimation apparatus includes a database storing 3D model data indicating a printing part and usage amount information of each material in one spraying process, a printing data generating part for generating 3D data of a printing object including the printing part and a support, an area splitting part for splitting the 3D data into at least one area, a material determining part for determining a type and a printing pattern of each material constituting each of the at least one area, and a material usage amount estimating part for determining a number of times each material is sprayed on the at least one area based on the determined type and the printing pattern of each material, and estimating a usage amount of each material to be printed the printing object based on the determined number of times and the usage amount information.

16 Claims, 11 Drawing Sheets

(51) Int. Cl.
*B33Y 40/00* (2020.01)
*B33Y 10/00* (2015.01)
*B29C 64/20* (2017.01)
*B33Y 30/00* (2015.01)

FIG. 7

| Process | Printing time estimation | | Total |
|---|---|---|---|
| Moving process | x-axis movement | Twenty-five minutes | Fifty-five minutes |
| | y-axis movement | Twenty-five minutes | |
| | z-axis movement | Five minutes | |
| Material spraying process | First cartridge material | Twenty minutes | Forty minutes |
| | Second cartridge material | Ten minutes | |
| | Third cartridge material | Ten minutes | |
| Cleaning process | Number of cleaning times | Forty times | Twenty minutes |
| Flattening process | Total number of layers | Five hundreds | Ten minutes |
| Curing process | – | | – |
| ⋮ | | | |
| Estimated printing time : two hours and ten minutes | | | |

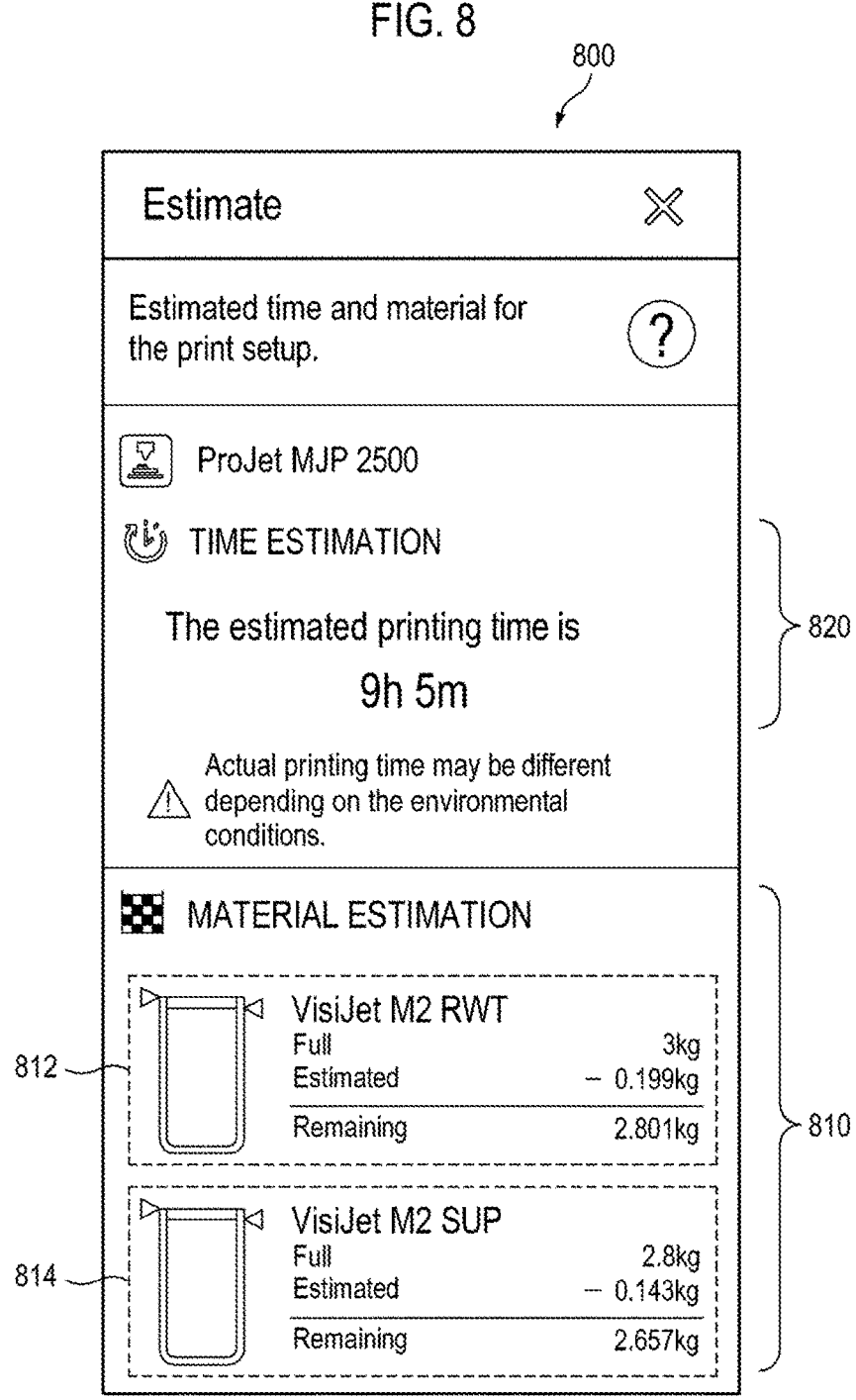

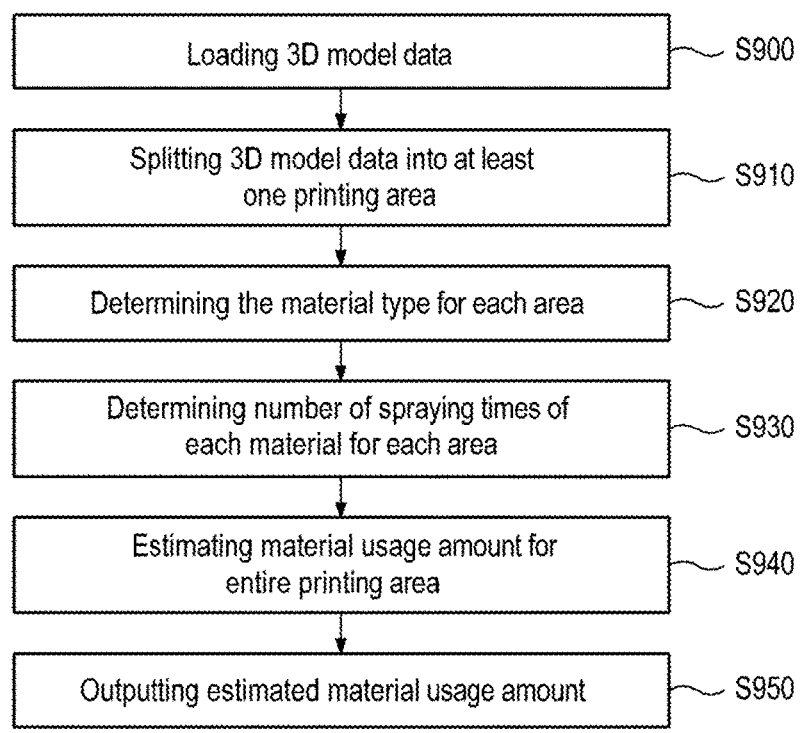

APPARATUS AND METHOD FOR ESTIMATING MATERIAL USAGE AMOUNT AND PRINTING TIME FOR THREE-DIMENSIONAL PRINTER

TECHNICAL FIELD

The present disclosure relates to an apparatus and a method for estimating information regarding a three-dimensional (3D) printer and a 3D printing operation by the 3D printer.

This research was supported by the MOTIE (Ministry of Trade, Industry and Energy), Korea, under the R&D program supervised by the KEIT (Korea Evaluation Institute of Industrial Technology), Korea "(10045898) and the MCST (Ministry of Culture, Sports and Tourism), Korea, Under the R&D program supervised by the KOCCA (Korea Creative Content Agency)" (APP0120150512002)

BACKGROUND

There has recently been widespread use of 3D printers that use various printing types in diversified application fields. The printing time of a 3D printer varies depending on the printing type of the printer, the volume (size) and shape of the printing object, and the like, but a number of hours or tens of hours are normally needed. The 3D printers may also use different kinds of materials for respective parts of the printing object, and different materials are accordingly determined and prepared in advance with regard to respective parts of the printing object. If a specific material is used up while the printing object is being printed, however, it may be required that the entire printing process be restarted from the beginning in view of the geometrical connection among parts of the printing object, the order of printing the parts, or the like. Therefore, there has been a need, prior to actual printing of the printing object using the 3D printer, to accurately estimate the material usage amount for printing the printing object and the printing time.

However, conventional the 3D printers do not always provide the estimated values of the material usage amount and the printing time. Even if the 3D printers provide the estimated value of the printing time or the material usage amount, the estimation procedure takes a long time, in some cases, or the estimated value greatly differs from the actual value.

SUMMARY

The present disclosure provides a method and an apparatus for estimating the material usage amount and the printing time of a 3D printer in an accurate and fast manner.

According to an aspect of the present disclosure, there is provided a 3D printing estimation apparatus for estimating information regarding a 3D printing operation by a 3D printer. An apparatus according to an exemplary embodiment includes: a database configured to store 3D model data indicating a printing part and usage amount information of each material in one spraying process; a printing data generating part configured to generate 3D data of a printing object including the printing part and a support based on the 3D model data; an area splitting part configured to split the 3D data into at least one area; a material determining part configured to determine a type and a printing pattern of each material constituting each of the at least one area; and a material usage amount estimating part configured to determine a number of times each material is sprayed on the at least one area based on the determined type and the printing pattern of each material, and to estimate a usage amount of each material needed to print the printing object based on the determined number of times each material is sprayed and the usage amount information of each material in one spraying process.

In addition, according to another embodiment, the database is configured to further store performance data regarding the 3D printer, and the 3D printing estimation apparatus further includes a printing process determining part configured to determine a printing process for printing the printing object and a printing time estimating part configured to estimate a printing time needed to perform the printing process based on the performance data regarding the 3D printer. In this regard, the printing process includes at least one selected from a group consisting of a moving process, a material spraying process, a cleaning process, a flattening process, and a curing process.

According to the aspects of the present disclosure, 3D printing estimation apparatus can prevent any unnecessary waste of materials by accurately estimating the materials actually used to print the printing object by the 3D printer. Furthermore, the actual printing time by the 3D printer is accurately estimated, thereby providing a more convenient working environment in the user's place.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 7 is a diagram illustrating a process of estimating a printing time according to one embodiment of the present disclosure.

FIG. 8 is a diagram illustrating a user screen displaying the result of estimating the usage amount of each material and the printing time according to one embodiment of an embodiment of the present disclosure.

FIG. 9 is a flowchart illustrating a method for estimating a material usage amount to be used by a 3D printer according to one embodiment of the present disclosure.

DETAILED DESCRIPTION

Figure 1:
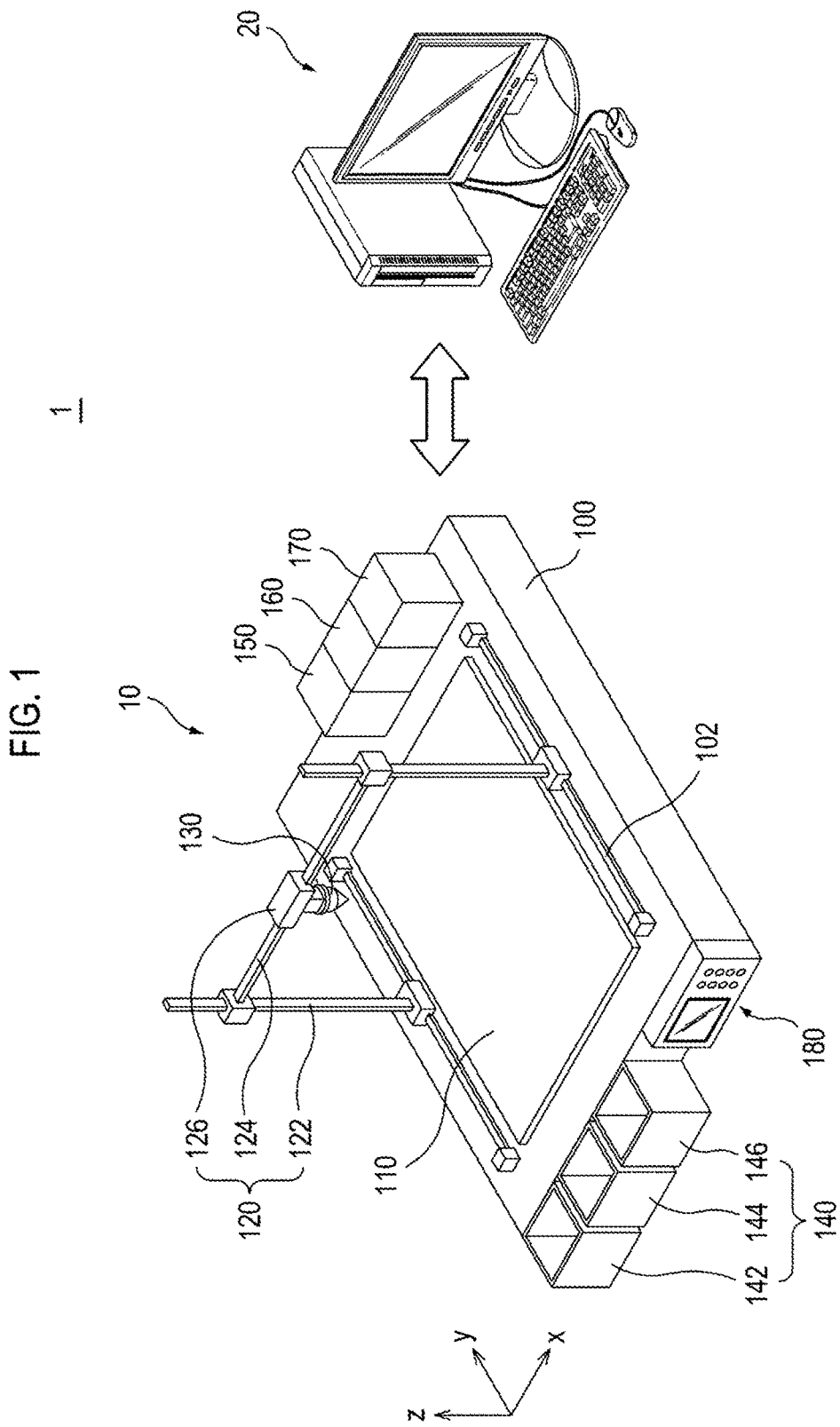
FIG. 1 is a diagram illustrating a 3D printing system according to one embodiment of the present disclosure.

Hereinafter, embodiments of the present disclosure will be described in detail with reference to the accompanying drawings such that a person skilled in the art to which the present disclosure pertains can easily implement the same. However, the present disclosure can be realized in various different modes, and is not limited to the embodiments described herein. For clear description of the present disclosure, parts irrelevant to the description have been omitted from the drawings, and similar parts are given similar reference numerals throughout the entire specification.

In the entire specification, the description that a part is "connected" to another part not only denotes that the two parts are "directly connected", but also includes the case in which they are "electrically connected" with a different element interposed therebetween. In addition, the description that a part "includes" a constituent element means, unless specified otherwise, that other constituent elements are not excluded, but can be further included.

FIG. 1 is a diagram illustrating a 3D printing system 1 according to one embodiment of the present disclosure.

As illustrated in FIG. 1, the 3D printing system 1 includes a 3D printer 10 and a computing system 20. The 3D printer 10 according to the present disclosure may realize or support various types of printing technologies, such as SLS (Selective Laser Sintering), FFF (Fused Filament Fabrication), FDM (Fused Deposition Modeling), SLA (Stereo Lithography Apparatus), DLP (Digital Light Processing), PBP (Powder Bed and inkjet head 3D Printer), Polyjet (Photopolymer Jetting), MJM (Multi Jet Modeling), DMT (Laser-aided Direct Metal Tooling), and LOM (Laminated Object Manufacturing).

The 3D printer 10 and the computing system 20 may be connected by a wireless or wired network. For example, the network connecting the 3D printer 10 and the computing system 20 may include a wired network, such as a local area network (LAN), a wide area network (WAN), or a value-added network (VAN), or any kind of wireless or wired network, such as a mobile radio communication network, a satellite communication network, Bluetooth, Wibro (Wireless Broadband Internet), or HSDPA (High Speed Downlink Packet Access).

The 3D printer 10 may include a body 100, a stage 110, a movement mechanism 120, a printer head 130, a cartridge 140, a cleaning part 150, a flattening part 160, a curing part 170, and a control part 180. Rails 102 are installed on the body 100 in a Y-direction. The stage 110 is installed on the body 100 and supports the printing object, which is formed thereon. For example, the stage 110 may be fixedly installed on the body 100 or installed to be detachable from the body 100.

The movement mechanism 120 is installed to be movable on the body 100. The movement mechanism 120 includes a Y-direction straight movement mechanism 122, a Z-direction straight movement mechanism 124, and an X-direction straight movement mechanism 126. The Y-direction straight movement mechanism 122 is coupled to the rails 102 such that the Y-direction straight movement mechanism 122 can make reciprocating straight movements on the body 100 in the Y-direction. The Z-direction straight movement mechanism 124 is coupled to the Y-direction straight movement mechanism 122 such that the Z-direction straight movement mechanism 124 can make reciprocating straight movements in the Z-direction with regard to the Y-direction straight movement mechanism 122. The X-direction straight movement mechanism 126 is coupled to the Z-direction straight movement mechanism 124 such that the X-direction straight movement mechanism 126 can make reciprocating straight movements in X-direction with regard to the Z-direction straight movement mechanism 124.

Although the rails 102 are installed in the Y-direction and the Y-direction straight movement mechanism 122 is coupled to the rails 102 in the present embodiment, the present disclosure is not limited thereto. For example, the rails 102 may be installed in the X-direction, and the Y-direction straight movement mechanism 122 may be coupled to the rails 102 such that the Y-direction straight movement mechanism 122 can make reciprocating straight movements on the body 100 in the X-direction. In this case, the X-direction straight movement mechanism 126 may be coupled to the Z-direction straight movement mechanism 124 such that the X-direction straight movement mechanism 126 can make reciprocating straight movements in the Y-direction.

In addition, although the leftward/rightward direction and the forward/backward direction are defined as X-direction and Y-direction, respectively, in the present embodiment provided that the 3D printer 10 is viewed from the front, the present disclosure is not limited thereto. For example, the leftward/rightward direction and the forward/backward direction may be defined as Y-direction and X-direction, respectively, provided that the 3D printer 10 is viewed from the front.

The printer head 130 is coupled to the X-direction straight movement mechanism 126. The printer head 130 may be moved in XYZ-directions by a movement of one of the Y-direction straight movement mechanism 122, the Z-direction straight movement mechanism 124, and the X-direction straight movement mechanism 126 or by a movement of a combination of at least one thereof. The printer head 130 sprays materials that constitute the printing object (the object to be printed) in a predetermined position in a space on the stage 110. The printing object includes a plurality of layers (or slices). The printer head 130 may move in the XY-direction by means of the movement mechanism 120 and spray a material in the predetermined position, thereby forming a single layer. In addition, the printer head 130 may be moved in the Z-direction by the movement mechanism 120 in order to form a new layer on the already-formed layer. After the movement, the printer head 130 may spray a material on the already-formed layer while being moved in the XY-direction by the movement mechanism 120, thereby forming a new layer. Such a process may be repeatedly performed to laminate a plurality of layers, thereby forming the printing object.

The cartridge 140 stores the materials that constitute the printing object. The cartridge 140 may include first to third cartridges 142, 144, and 146. The materials stored in the first to third cartridges 142, 144, and 146 may be, for example, polymer, metal, ceramic, wax, glass, rubber, plaster, wood pulp, or a combination thereof, but are not limited thereto. Each of the first to third cartridges 142, 144, and 146 may store a different material. As used herein, the expression "different materials" may include all of the following cases, the case in which the components that constitute the materials differ, the case in which the ratios of components of the materials differ, and the case in which the conditions (for example, colors) of the materials differ.

For example, the first cartridge 142 may have a red polymer stored therein, the second cartridge 144 may have a green polymer stored therein, and the third cartridge 146 may have a blue polymer stored therein. As another example, the first cartridge 142 may have a polymer with a first component stored therein, the second cartridge 144 may have a polymer with a second component stored therein, and the third cartridge 146 may have a polymer with a third component stored therein. As another example, the first cartridge 142 may have a polymer stored therein, the second cartridge 144 may have a metal stored therein, and the third cartridge 146 may have ceramic stored therein. As another example, the first cartridge 142 may have a polymer and a metal stored therein at a ratio of 2:1, the second cartridge 144 may have a polymer and a metal stored therein at a ratio of 1:1, and the third cartridge 146 may have a polymer and a metal stored therein at a ratio of 1:2.

Each of the first to third cartridges 142, 144, and 146 is connected to the printer head 130 through a material supply tube (not illustrated). At least one of the materials stored in the first to third cartridges 142, 144, and 146 is supplied to the printer head 130 through the material supply tube. Although it has been assumed in the above description of an embodiment that the 3D printer 10 is provided with three cartridges 142, 144, and 146, the configuration or number of the cartridges is not limited thereto, and a combination of two or less of cartridges with different configurations, or a combination of four or more thereof, may be provided.

The cleaning part 150 is installed on the body 100 such that the printer head 130 can be cleaned. There may occur a situation, during printing of the printing object, in which the printer head 130 is clogged by the materials, or in which foreign substances adhere to the printer head 130. The cleaning part 150 may periodically conduct cleaning in order to prevent such a situation from degrading the quality of the printing object. Furthermore, the cleaning part 150 may also conduct the cleaning before the start of printing of the printing object and/or after the completion of printing of the printing object. For example, the cleaning part 150 may remove the foreign substances from the printer head 130. As another example, the cleaning part 150 may replace a part of the feature of the printer head 130 or the entire feature thereof.

The flattening part 160 may be installed on the body 100 so as to flatten the materials sprayed from the printer head 130. The flattening part 160 may include a feature capable of pressurizing the upper portion of the sprayed materials, such as a roller. For example, when the printer head 130 finishes spraying a material that constitutes a single layer, the flattening part 160 may start an operation for flattening the sprayed material.

The curing part 170 may be installed on the body 100 so as to cure the printing object. The curing part 170 may include a feature capable of curing the printing object, such as a light source or a heat source. For example, after a part or all of a plurality of layers constituting the printing object are laminated, the curing part 170 may emit light to the laminated layers or heat the laminated layers such that the corresponding layers are cured.

Selectively or additionally, the 3D printer 10 may include a cooling part (not illustrated). The cooling part may perform various cooling operations depending on the type, condition, performance, and the like of the 3D printer 10. For example, if there is a possibility that thermal coagulation of the materials will occur due to the large volume of the printing object, the cooling part may periodically cool the materials or the printer in order to improve the printing quality.

The control part 180 may be installed on the body 100 so as to control the operations of the movement mechanism 120, the printer head 130, the cartridge 140, the cleaning part 150, the flattening part 160, the curing part 170, the cooling part, and the like. Moreover, the control part 180 may test the performance of each feature of the 3D printer 10 (for example, the velocity of movement of the movement mechanism 120 and the acceleration thereof) and store the test result value. Furthermore, the control part 180 may include a communication interface for communicating with the computing system 20. In addition, the control part 180 may include a user interface for receiving an input of the operation of the 3D printer 10 from the user or outputting the status of the 3D printer 10 to the user.

Meanwhile, the computing system 20 may load 3D model data regarding the printing object that is to be printed by the 3D printer 10. The printing object, as used herein, includes a printing part that corresponds to the product, which will be completed through necessary processing after the printing is finished, and a support for supporting the printing part from beneath or inside the printing part while the printing part is being printed. The 3D model data may be stored in the database of the computing system 20 in advance or may be received from the outside through the communication network. In addition, the computing system 20 may edit the 3D model data using an editing tool. Furthermore, the computing system 20 may measure the numerical value of a partial area or the entire area of the 3D model data.

The computing system 20 may transfer a printing command to the 3D printer 10. Together with the printing command, the computing system 20 may transfer the 3D model data to the 3D printer 10. The computing system 20 may also control the operation mode (for example, resolution, printing rate) related to the printing operation of the 3D printer 10. The 3D printer 10 may receive the printing command, together with the 3D model data, from the computing system 20 and then start printing the printing object.

The computing system 20 according to the present disclosure may estimate the usage amount of the materials used to print the printing object by the 3D printer 10. More specifically, the computing system 20 may estimate the usage amount of the materials to be used to print the printing object including a printing part and a support. Assuming, for example, that the first to third cartridges 142, 144, and 146 have first to third materials stored therein, respectively, the computing system 20 may estimate the amounts of the first to third materials used to print the printing object, respectively.

The computing system 20 may split the printing object into at least one area based on the 3D model data, in order to estimate the material usage amount. In each split area, the same material and/or the same printing pattern may be formed. As used herein, the "printing pattern" may be formed using a single material or a combination of different materials, and a single printing pattern may be formed according to the ratio of composition of a single material or the ratio of combination of at least one material, determined in advance. The split areas are formed with different materials or in different printing patterns (for example, different printing patterns including one or more materials in different ratios of composition or combination). The computing system 20 determines the number of times the materials are to be sprayed with regard to all areas based on the material and/or printing pattern that constitute each area. Furthermore, the computing system 20 may estimate the usage amount of the materials with regard to the entire area of the printing object based on the number of times the materials are to be sprayed, determined with regard to each area, and information regarding the weight of each material sprayed each time.

As a comparative example, there is a method for estimating the material usage amount based on the material and the printing pattern of layers laminated by the 3D printer in order to print the printing object. This method requires counting of each material filling the pixels that constitute each and every layer constituting the printing object. In this case, it takes a considerable estimation time to count material information with regard to every pixel constituting the printing object. In contrast, according to the method adopted by the present disclosure, the printing object is split into at least one area formed with the same material and/or in the same printing pattern, and the material usage amount is estimated accordingly. According to the present disclosure, therefore, the material usage amount can be estimated more efficiently compared with the method of estimating the material usage amount based on the number of pixels of layers constituting the printing object.

Furthermore, the computing system 20 according to one embodiment of the present disclosure may estimate the time needed to print the printing object. The computing system 20 may determine a printing process based on 3D model data, in order to estimate the printing time. The printing process may include at least one of a moving process of the movement mechanism 120, a material spraying process of the printer head 130, a cleaning process of the cleaning part 150, a flattening process of the flattening part 160, and a curing process of the curing part 170.

The computing system 20 may estimate the time needed during each printing process. For example, the time needed during the moving process may be estimated based on the velocity of movement of the movement mechanism 120, the acceleration thereof, the distance of movement thereof, and the like. In addition, the computing system 20 may estimate the time needed during the material spraying process based on the number of times each material is sprayed by the printer head 130, the spraying time needed per spraying of each material, and the like. In addition, the computing system 20 may estimate the time needed during the cleaning process based on the number of times cleaning is to be conducted by the cleaning part 150, the cleaning frequency, the time needed per each cleaning, and the like. In addition, the computing system 20 may estimate the time needed during the flattening process based on the number of times flattening is to be conducted by the flattening part 160, the flattening frequency, the time needed per each flattening, and the like. In addition, the computing system 20 may estimate the time needed during the curing process based on the number of times curing is to be conducted by the curing part 170, the curing frequency, the time needed per each curing, and the like. The computing system 20 may estimate the total time needed to print the printing object by adding up the estimated time needed during each process with regard to all processes for printing the printing object.

The computing system 20 according to one embodiment of the present disclosure may store and manage data regarding the performance of the 3D printer 10 in a database (not illustrated). For example, the data regarding the performance of the 3D printer 10 may include the velocity of movement of the movement mechanism 120, the acceleration thereof, the spraying time needed per spraying of each material by the printer head 130, the time needed per cleaning by the cleaning part 150, the time needed per flattening by the flattening part 160, the time needed per curing by the curing part 170, information regarding the weight of each material sprayed per spraying, and the like. When the data regarding the performance of the 3D printer 10 needs to be updated, the computing system 20 may receive updated performance data from the 3D printer 10 and store the updated performance data in the database.

Figure 2:
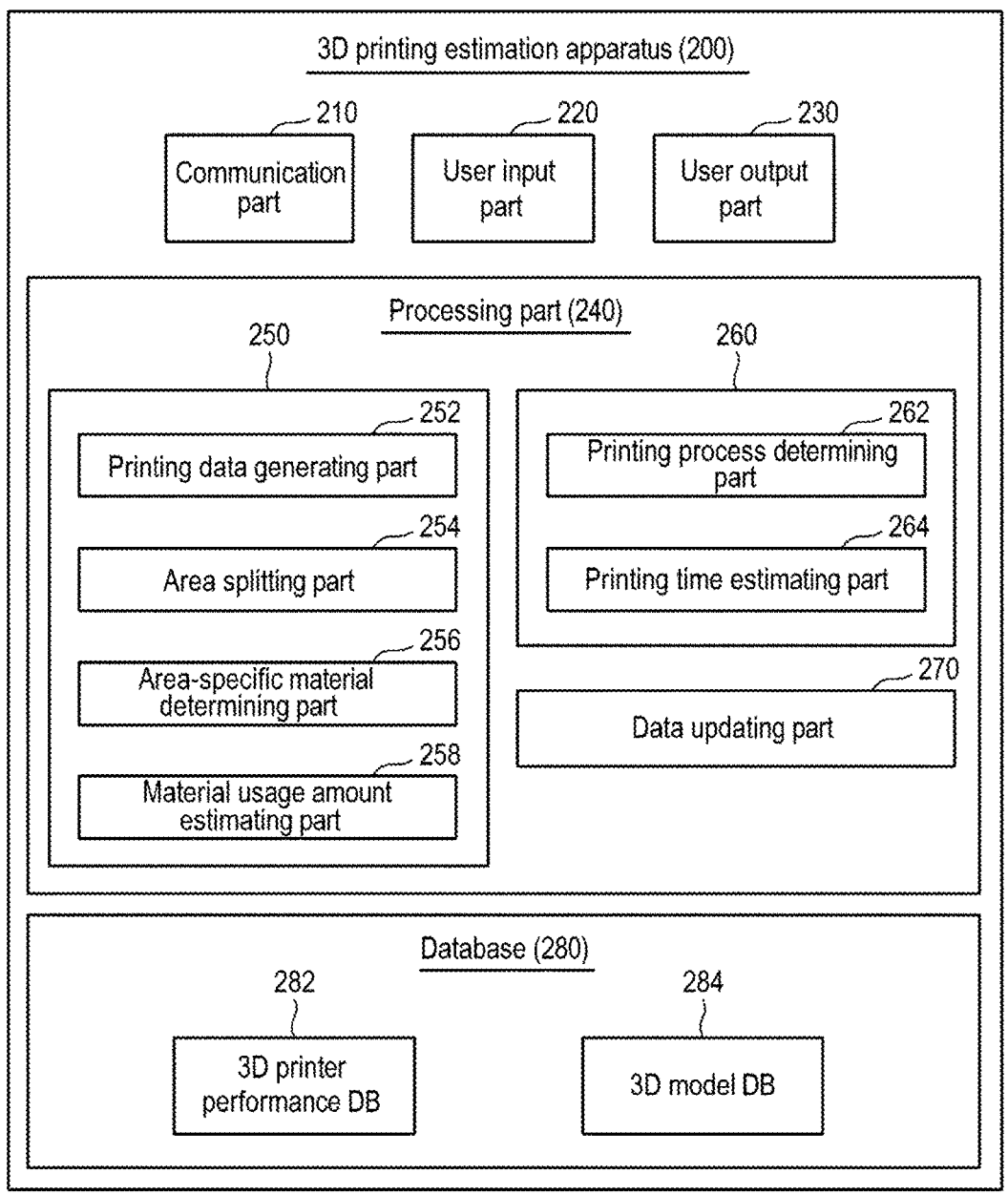
FIG. 2 is a diagram illustrating the configuration of a 3D printing estimation apparatus according to one embodiment of the present disclosure.

FIG. 2 is a diagram illustrating the configuration of a 3D printing estimation apparatus 200 that estimates the material usage amount for 3D printing and the printing time according to one embodiment of the present disclosure.

According to various embodiments, the 3D printing estimation apparatus 200 may be implemented by the computing system 20 of FIG. 1, or may constitute a part of the computing system 20. According to another embodiment, the 3D printing estimation apparatus 200 may be implemented by the control part 180 of the 3D printer 10 of FIG. 1, or may constitute a part of the control part 180. According to still another embodiment, the 3D printing estimation apparatus 200 may be distributed in and implemented by the computing system 20 and the control part 180. It will be assumed in the following description of an embodiment that, in general, the 3D printing estimation apparatus 200 is implemented by the computing system 20 of FIG. 1 or constitutes a part of the computing system 20.

As illustrated in FIG. 2, the 3D printing estimation apparatus 200 includes a communication part 210, a user input part 220, a user output part 230, a processing part 240, and a database 280. The communication part 210 is a feature for communicating with another server, a device, a terminal, or the like, and can transmit/receive data to/from the 3D printer 10. The user input part 220 may receive an input related to estimation of the material usage amount and the printing time from the user. For example, the user input part 220 may receive an input for estimating the material usage amount and the printing time, an input for updating data regarding the performance of the 3D printer 10, and the like from the user. The user input part 220 may include a keyboard, a mouse, a touchpad, a touchscreen, and the like. The user output part 230 provides the user with an output related to estimation of the material usage amount and the printing time. For example, the user output part 230 may display the 3D model data, the printing object that has been split into areas, the estimated printing time, the estimated material usage amount, and the like. The user output part 230 may include an LCD (liquid crystal display), an LED (light emitting diode) display, an OLED (organic light emitting diode) display, and the like.

The processing part 240 includes a material usage amount estimating part 250, a printing time estimating part 260, and a data updating part 270. The material usage amount estimating part 250 includes a printing data generating part 252, an area splitting part 254, an area-specific material determining part 256, and a material usage amount estimating part 258. The printing time estimating part 260 includes a printing process determining part 262 and a printing time estimating part 264. Furthermore, the database 280 includes a 3D printer performance DB 282 and a 3D model DB 284.

According to one embodiment, the material usage amount estimating part 250 may be activated when the user input part 220 receives an input for estimating the material usage amount from the user. The printing data generating part 252 generates 3D data regarding the printing object based on the 3D model data that indicates a printing part stored in the 3D model DB 284. The 3D data regarding the printing object includes the printing part data corresponding to the printing part and support data corresponding to the support. The printing data generating part 252 may generate the 3D data regarding the printing object based on at least one of the structure, shape, and volume of the printing part. According to one embodiment, the support data may be determined based on the structure, shape, volume, and the like of the printing part indicated by the printing part data. When there is no need for a support for supporting the printing part while the printing part is being printed according to the printing type of the 3D printer 10, the 3D data may solely include the printing part data.

The area splitting part 254 may split the 3D data regarding the printing object into at least one area. In each split area, the printing object is formed with the same material and/or in the same printing pattern. The splitting process by the area splitting part 254 may be determined by at least one of the structure, shape, volume, material, and position of the printing object. For example, the area splitting part 254 may split the outer area of the printing part data into a first area, and may split the inner area of the printing part data into a second area. Furthermore, the area splitting part 254 may split the outer area of the support data into a third area, and may split the inner area of the support data into a fourth area.

According to a number of embodiments, the 3D model data, which indicates the printing part, or 3D data regarding the printing object may be transferred from the 3D printing estimation apparatus 200 to the 3D printer 10. The control part 180 of the 3D printer 10 may generate data for 3D printing, which is used to print the printing object, based on the 3D model data or the 3D data. The data for 3D printing may differ from the 3D data generated by the 3D printing estimation apparatus 200. For example, the data for 3D printing may include information regarding what material fills pixels constituting each layer, with regard to all layers that constitute the printing object. The 3D data generated by the 3D printing estimation apparatus 200 may include information used to estimate the material usage amount and the printing time regarding the printing object, unlike the data for 3D printing. Due to such a difference between the pieces of information, the time needed to generate the 3D data may be shorter than the time needed to generate the data for 3D printing, with regard to the same printing object. Furthermore, the capacity of the 3D data may be smaller than that of the data for 3D printing, with regard to the same printing object.

The area-specific material determining part 256 may determine the type and the printing pattern of the material with regard to each area split by the area splitting part 254. For example, the area-specific material determining part 256 may determine to fill the first area with the first material, which is stored in the first cartridge 142, at a ratio of 100% and may determine the printing pattern the first material, which is stored in the first cartridge 142, in a predetermined printing pattern and to fill the second area therewith at a ratio of 50%. Furthermore, the area-specific material determining part 256 may determine to fill the third area with the second material, which is stored in the second cartridge 144, at a ratio of 80% in a predetermined printing pattern and may determine to fill the fourth area with the third material, which is stored in the third cartridge 146, at a ratio of 20% in a predetermined printing pattern.

The area-specific material determining part 256 may determine the type and the printing pattern of the material of the corresponding area based on at least one of the structure, shape, volume, and position of each area. For example, the area-specific material determining part 256 may make a determination such that the outermost area of the printing part has a solid material and/or a dense printing pattern compared with the inner area of the printing part. Furthermore, the area-specific material determining part 256 may make a determination such that an area of the support, which supports the printing part and has a large weight or volume, has a comparatively solid material and/or dense printing pattern.

Although the printing data generating part 252, the area splitting part 254, and the area-specific material determining part 256 are illustrated as separate features in FIG. 2, they may be implemented as a single feature or as two features. When implemented as a single feature, at least two processes among the process of generating the 3D data regarding the printing object, the process of splitting each area, and the process of determining the material and the printing pattern of each area may proceed simultaneously.

The material usage amount estimating part 258 may determine the number of times the materials are to be sprayed by the 3D printer 10 in order to form respective split areas, based on the material and/or printing pattern constituting each split area. For example, the material usage amount estimating part 258 may make the following determinations: the first material stored in the first cartridge 142 needs to be sprayed 100 times in order to form the first area; the first material stored in the first cartridge 142 needs to be sprayed 200 times in order to form the second area; the second material stored in the second cartridge 144 needs to be sprayed 100 times in order to form the third area; and the second material stored in the second cartridge 144 needs to be sprayed 50 times in order to form the fourth area.

The material usage amount estimating part 258 may estimate the material usage amount regarding the entire area based on information regarding the usage amount of each material per spraying (for example, weight information) stored in the 3D printer performance DB 282. The material usage amount estimating part 258 may estimate the material usage amount regarding the entire area by multiplying the number of times the materials are to be sprayed for respective areas and the weight of the respective materials per spraying. Assuming, for example, that 0.1 g of the first material is sprayed per spraying and 0.2 g of the second material is sprayed per spraying, the calculation result by the material usage amount estimating part 258 may indicate that the estimated usage amount of the first material is 30 g and the estimated usage amount of the second material is 30 g. The estimated material usage amount calculated in this manner may be output to the user through the user output part 230.

According to a number of embodiments, the material usage amount estimating part 250 may estimate the amount of a material to be used to perform a printing process (for example, cleaning) of the printing object, besides the materials that constitute the printing object. In this case, the material usage amount estimating part 250 may store the estimated usage amount in the database 280 or may transfer the estimated usage amount to the 3D printer 10 through the communication part 210. Furthermore, the material usage amount estimating part 250 may output the estimated usage amount to the user through the user output part 230 together with or separately from the amount of the materials to be used to constitute the printing object.

The material usage amount estimating part 250 according to the present disclosure splits the printing object into at least one area formed with the same material and/or in the same printing pattern and estimates the usage amount of the respective materials with regard to all areas. This is advantageous in that the time needed to estimate the material usage amount can be shortened.

According to one embodiment, the printing time estimating part 260 may be activated when the user input part 220 receives an input for estimating the printing time from the user. For example, the printing process determining part 262 may generate the 3D data regarding the printing object based on the 3D model data stored in the 3D model DB 284 and may determine a printing process for printing the printing object based on the generated 3D data regarding the printing object. As another example, when a process for estimating the material usage amount and the printing time proceeds together, the printing process determining part 262 may determine the printing process for printing the printing object based on the 3D data regarding the printing object generated by the printing data generating part 252 or by the control part 180 of the 3D printer 10.

According to one embodiment, the printing process may be a series of processes for forming the printing object enumerated in the time order. According to another embodiment, the printing process may be a classification of processes for forming the printing object according to the type. The printing process may include at least one of various processes including a moving process of the movement mechanism 120, a material spraying process of the printer head 130, a cleaning process of the cleaning part 150, a flattening process of the flattening part 160, a curing process of the curing part 170, and a cooling process of the cooling part.

The printing time estimating part 264 may estimate the time needed to perform a printing process determined by the printing process determining part 262 based on 3D printer performance data stored in the 3D printer performance DB 282. For example, the printing time estimating part 264 may estimate the time needed by the moving process based on the velocity of movement of the movement mechanism 120, the acceleration thereof, the distance of movement thereof, and the like stored in the 3D printer performance DB 282. In addition, the printing time estimating part 264 may estimate the time needed by the material spraying process based on the number of times each material is to be sprayed by the printer head 130, the spraying time needed per spraying of each material, and the like stored in the 3D printer performance DB 282. In addition, the printing time estimating part 264 may estimate the time needed by the cleaning process based on the number of times cleaning is to be conducted by the cleaning part 150, the cleaning frequency, the time needed per cleaning, and the like stored in the 3D printer performance DB 282. In addition, the printing time estimating part 264 may estimate the time needed by the flattening process based on the number of times flattening is to be conducted by the flattening part 160, the flattening frequency, the time needed per flattening, and the like stored in the 3D printer performance DB 282. In addition, the printing time estimating part 264 may estimate the time needed by the curing process based on the number of times curing is to be conducted by the curing part 170, the curing frequency, the time needed per curing, and the like stored in the 3D printer performance DB 282. In addition, the printing time estimating part 264 may estimate the time needed by the cooling process based on the number of times cooling is to be conducted by the cooling part, the cooling frequency, the time needed per cooling, and the like stored in the 3D printer performance DB 282.

The printing time estimating part 264 may estimate the total printing time needed to print the printing object by adding up the estimated time needed by each process, with regard to all processes for printing the printing object. The printing time estimated in this manner may be output to the user through the user output part 230.

According to one embodiment, the material usage amount estimating part 258 may determine the number of times cleaning is to be conducted based on the estimated time needed by the material spraying process. Furthermore, the material usage amount estimating part 258 may estimate the usage amount of the cleaning material needed to print the printing object, based on the determined number of times cleaning is to be conducted and information regarding the usage amount of the cleaning material per cleaning, stored in the 3D printer performance DB 282. The usage amount of the cleaning material, estimated in this manner, may be output to the user through the user output part 230.

Meanwhile, the data updating part 270 may update data stored in the database 280. The data updating part 270 may request the control part 180 of the 3D printer 10 to update performance data periodically or non-periodically. For example, the data updating part 270 may request the control part 180 of the 3D printer 10 to update performance data through the communication part 210 once every week. As another example, when the hardware performance or software performance of the 3D printer 10 is upgraded, the data updating part 270 may request the control part 180 of the 3D printer 10 to update performance data through the communication part 210. When updated performance data is received from the control part 180 through the communication part 210, the data updating part 270 may store the received performance data in the 3D printer performance DB 282.

The data updating part 270 according to the present disclosure requests the control part 180 of the 3D printer 10 to maintain the latest performance data such that the material usage amount estimating part 250 and the printing time estimating part 260 can estimate the material usage amount and the printing time more accurately.

FIG. 3 to FIG. 8 are diagrams illustrating a process for estimating the material usage amount for a 3D printing and the printing time and the result of estimation, according to one embodiment of the present disclosure.

Figure 3:
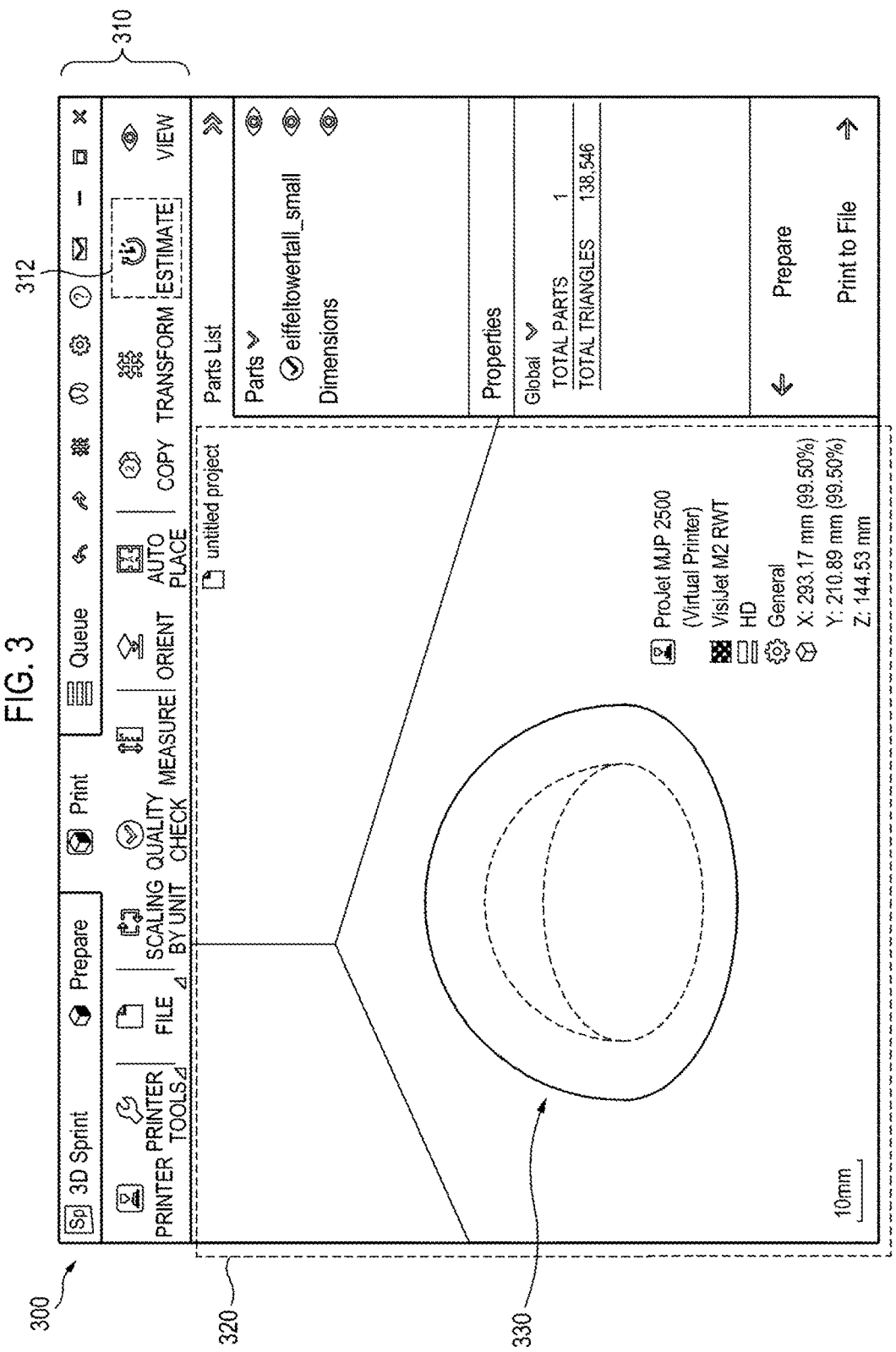
FIG. 3 illustrates a user screen displaying 3D model data according to one embodiment of the present disclosure.

FIG. 3 illustrates a user screen 300 displaying 3D model data 330 according to one embodiment of the present disclosure. For example, the user screen 300 may be a screen output through the user output part 230, and the 3D model data 330 may be data stored in the 3D model DB 284. The user screen 300 may include a selection menu 310 and a 3D data output area 320. The 3D model data 330 is illustrated in the 3D data output area 320. The 3D model data 330 indicates the printing part among parts of the printing object.

The selection menu 310 includes an estimation GUI 312 for estimating the material usage amount and the printing time. Although it is assumed in the illustration of FIG. 3 that a single integrated estimation GUI 312 is used to estimate the material usage amount and the printing time, the present disclosure is not limited thereto. For example, the selection menu 310 may include separate GUIs for estimating the material usage amount and the printing time, respectively. According to one embodiment, when the estimation GUI 312 is selected by the user, the material usage amount for the printing object, including the printing part, and the printing time are estimated.

Figure 4:
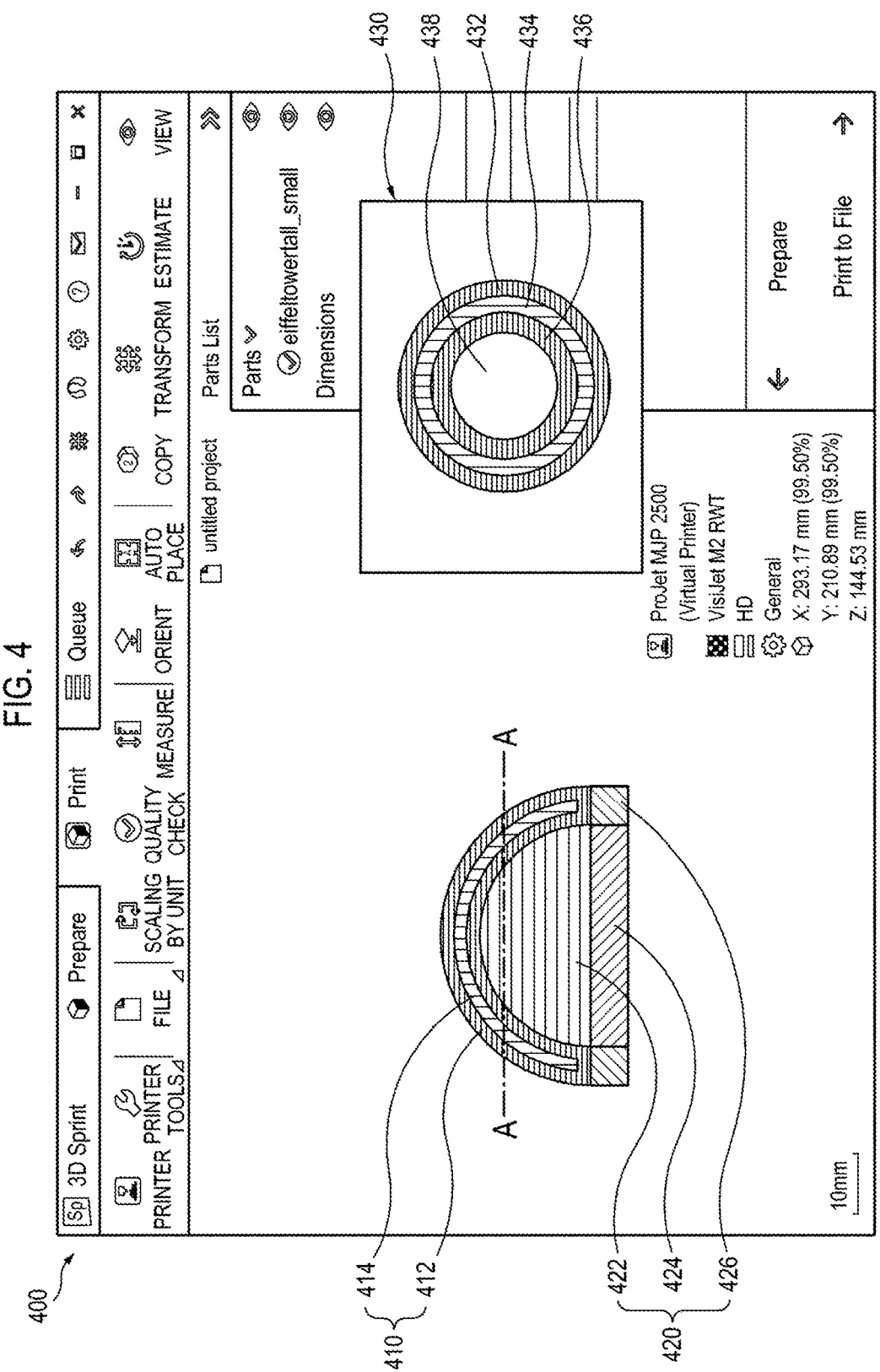
FIG. 4 illustrates a user screen displaying 3D data regarding a printing object according to one embodiment of the present disclosure.

FIG. 4 illustrates a user screen 400 displaying the 3D data regarding a printing object according to one embodiment of the present disclosure. For example, the user screen 400 may be a screen output through the user output part 230, and the 3D data regarding the printing object may be data generated by the area splitting part 254. The 3D data regarding the printing object, illustrated as a front sectional view, includes printing part data 410 and support data 420. The printing part data 410 includes a first area 412, which are inner and outer portions, and a second area 414, which is the center portion.

The support data 420 includes a third area 422, which is the inner portion of the printing part data 410, a fourth area 424, which is the lower center portion of the printing part data 410, and a fifth area 426, which is the lower outer portion of the printing part data 410. The first to fifth areas 412, 414, 422, 424, and 426 are formed with different materials or in different printing patterns.

According to the present embodiment, the 3D printing estimation apparatus 200 generates support data 420 based on the 3D model data and transfers the support data 420 to the 3D printer 10, but the present disclosure is not limited thereto. For example, when the 3D model data is transferred from the 3D printing estimation apparatus 200 to the 3D printer 10, the control part 180 of the 3D printer 10 may also generate support data based on the 3D model data. In this case, the support data generated by the control part 180 of the 3D printer 10 may differ from the support data 420 generated by the 3D printing estimation apparatus 200. For example, the support data 420 generated by the 3D printing estimation apparatus 200 may not be used to print the printing object, unlike the support data generated by the control part 180 of the 3D printer 10.

Furthermore, according to the present embodiment, the support data 420 is displayed on the user screen 400, but the present disclosure is not limited thereto. For example, the user screen 400 may not display the support data 420, and may display only the printing part data 410.

Selectively, the user screen 400 includes a layer display area 430 that indicates one layer among a plurality of layers constituting the 3D data. As illustrated in FIG. 4, in the layer display area 430, there is illustrated data 432, 434, 436, and 438 indicative of the material and the printing pattern of the layer corresponding to section A-A among the 3D data regarding the printing object.

The material usage amount estimating part 258 determines the number of times each material is to be sprayed with regard to each of the first to fifth areas 412, 414, 422, 424, and 426. In addition, the material usage amount estimating part 258 may estimate the total material usage amount with regard to the first to fifth areas 412, 414, 422, 424, and 426 based on information regarding the weight of each material per spraying, stored in the 3D printer performance DB 282. Selectively, the material usage amount estimating part 258 may separately estimate the material usage amount with regard to the first and second areas 412 and 414, which are related to the printing part, and the material usage amount with regard to the third to fifth areas 422, 424, and 426, which are related to the support.

Figure 5:
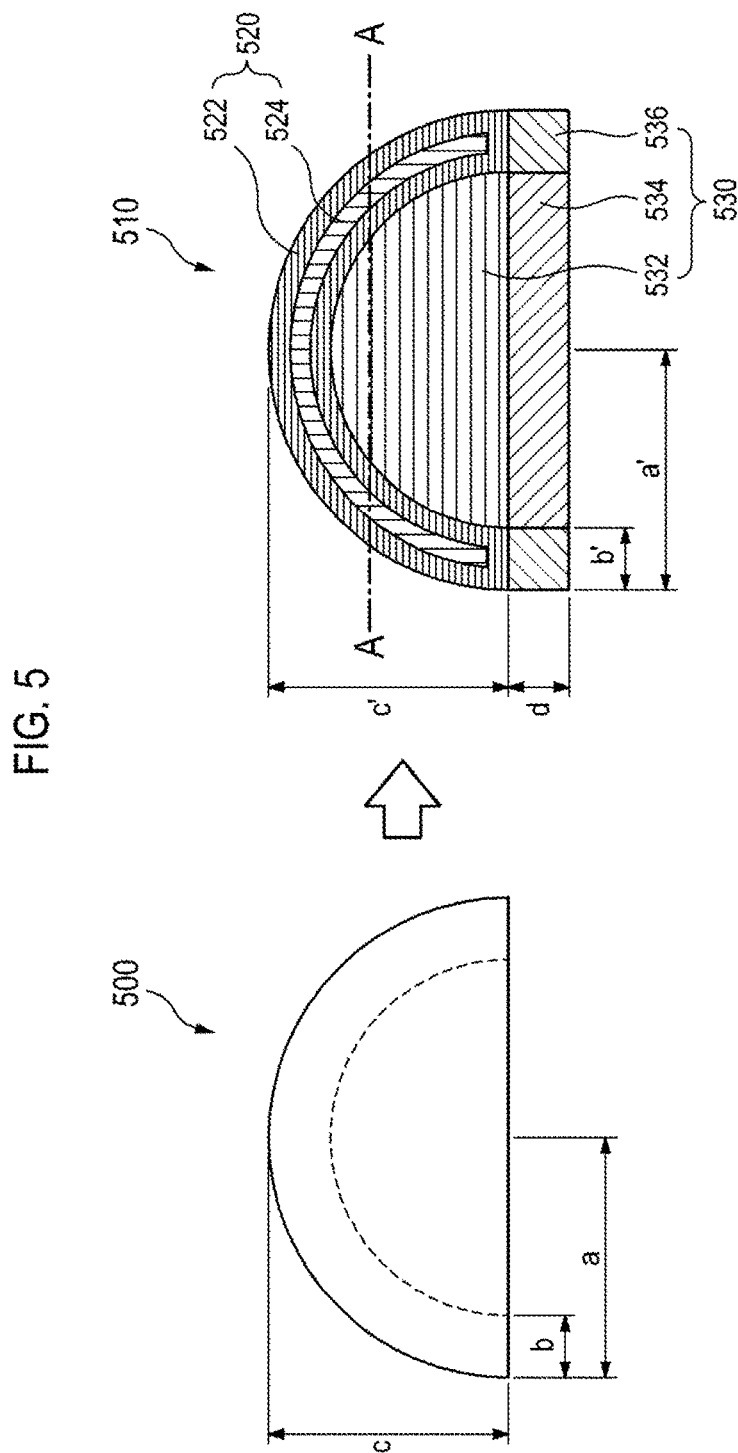
FIG. 5 is a diagram illustrating generation and splitting of the 3D data regarding the printing object according to one embodiment of the present disclosure.

FIG. 5 is a diagram illustrating a process of generating and splitting the 3D data regarding a printing object according to one embodiment of the present disclosure.

Such a process for generating and splitting may be performed by the printing data generating part 252 and the area splitting part 254 illustrated in FIG. 2. The printing data generating part 252 may generate the 3D data 510 regarding the printing object from the 3D model data 500 indicating a printing part. The 3D data 510 regarding the printing object includes printing part data 520, which corresponds to the printing part, and support data 530, which corresponds to the support.

The printing data generating part 252 may generate the 3D data 510 regarding the printing object based on at least one of the structure, shape, and volume of the printing part indicated by the 3D model data 500. For example, the printing data generating part 252 may generate support data 530 based on the hemispherical shape of the hollow printing part, the curvature thereof, radius a, length b, height c, and the like. The printing part data 520 may be identical to the 3D data 510 regarding the printing object.

Furthermore, the area splitting part 254 may split the 3D data 510 regarding the printing object into at least one area based on at least one of the structure, shape, volume, material, and position of the printing object indicated by the 3D data 510 regarding the printing object. For example, the area splitting part 254 may split the 3D data 510 regarding the printing object into first to fifth areas 522, 524, 532, 534, and 536 based on the hemispherical shape of the hollow printing part, the curvature thereof, the shape of the support formed on inner and lower portions of the printing part, radius a', length b', height c', height d, and the like.

Figure 6:
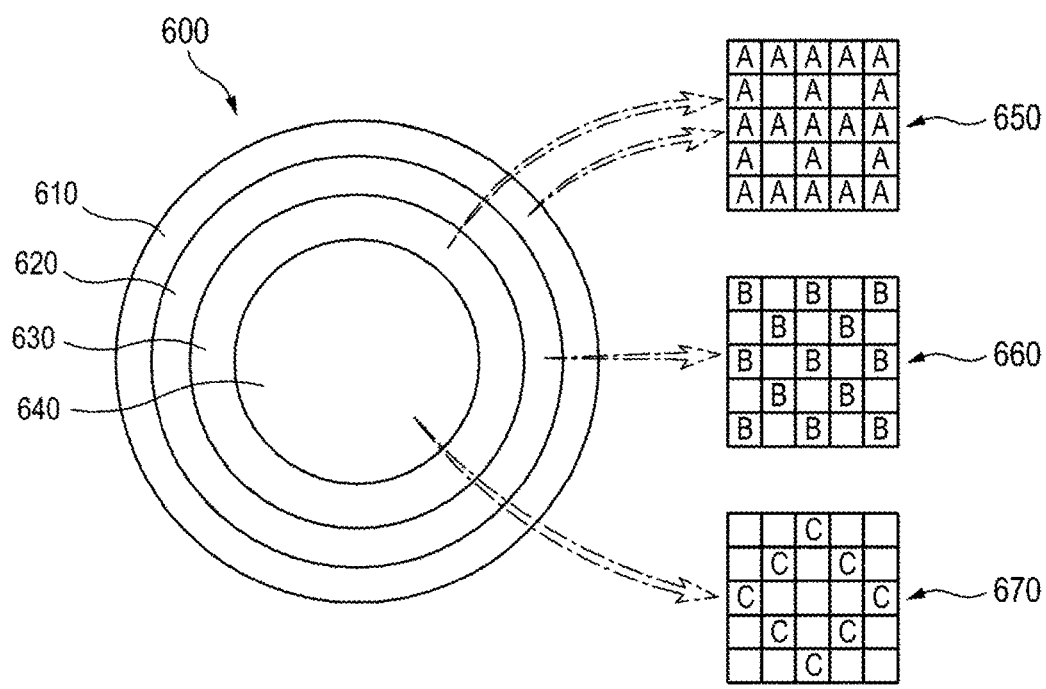
FIG. 6 is a diagram illustrating a type and a printing pattern of a material with regard to each area according to one embodiment of the present disclosure.

FIG. 6 is a diagram illustrating a type and a printing pattern of a material with regard to each area according to one embodiment of the present disclosure.

The area-specific material determining part 256 may determine the type and the printing pattern of the material of the corresponding areas 522, 524, 532, 534, and 536 based on at least one of the structure, shape, volume, and position of each of the first to fifth areas 522, 524, 532, 534, and 536 of the 3D data 510 illustrated in FIG. 5. For example, the area-specific material determining part 256 may determine the material and printing pattern of the first and second areas 522 and 524 of the printing part such that the material of the first area 522, which is positioned on the outer side of the printing part, is more solid than the material of the second area 524, which is positioned on the inner side of the printing part, and the printing pattern of the first area 522 is denser than the printing pattern of the second area 524.

The layer display area 600 illustrated in FIG. 6 corresponds to section A-A among the 3D data 510 of FIG. 5. The layer display area 600 includes four section areas 610, 620, 630, and 640. The first and third section areas 610 and 630 correspond to the first area 522 of the 3D data 510, the second section area 620 corresponds to the second area 524 of the 3D data 510, and the fourth section area 640 corresponds to the third area 532.

The area-specific material determining part 256 may determine the material and the printing pattern of the first to third areas 522, 524, and 532 such that the first to third areas 522, 524, and 532 have first to third materials and printing patterns 650, 660, and 670, respectively. The first to third materials and the printing patterns 650, 660, and 670 may be the smallest units of the repeated printing patterns. As illustrated in FIG. 6, the first material and printing pattern 650 appearing in the first and third section areas 610 and 630 have material "A" and air repeated at a ratio of 21:4. In addition, the second material and the printing pattern 660 appearing in the second section area 620 have material "B" and air repeated at a ratio of 13:12. In addition, the third material and the printing pattern 670 appearing in the fourth section area 630 have material "C" and air repeated at a ratio of 8:17. In this regard, materials "A", "B", and "C" may different from one another in terms of the composition, strength, viscosity, elasticity, color, and the like. In addition, materials "A", "B", and "C" may be the materials stored in the first to third cartridges 142, 144, and 146, respectively, illustrated in FIG. 1.

FIG. 7 is a diagram illustrating a process of estimating a printing time according to one embodiment of the present disclosure.

The process of estimating a printing time may be performed by the printing time estimating part 260 of FIG. 2. The printing time estimating part 260 may determine the printing process based on the 3D data 510 regarding a printing object. As illustrated in FIG. 7, the printing process may include a moving process, a material spraying process, a cleaning process, a flattening process, a curing process, and the like.

According to one embodiment related to the moving process, the printing time estimating part 260 may estimate the time needed by movements of the movement mechanism 120 along an x-axis/y-axis/z-axis based on the 3D data 510 regarding the printing object, the velocity of movement of the movement mechanism 120, the acceleration thereof, the distance of movement thereof, and the like. In addition, the printing time estimating part 260 may estimate the total time needed by the moving process by adding up the time needed by movements along the x-axis/y-axis/z-axis. According to another embodiment, the printing time estimating part 260 may estimate the time needed by a movement on each layer constituting the 3D data 510 regarding the printing object. In this case, the printing time estimating part 260 may estimate the total time needed by the moving process by adding up the time needed by movements on all layers.

According to one embodiment related to the material spraying process, the printing time estimating part 260 may estimate the time needed to spray first to third cartridge materials, respectively, based on the 3D data 510 regarding the printing object, the number of times each material is to be sprayed by the printer head 130, the spraying time needed per spraying of each material, and the like. According to another embodiment, the printing time estimating part 260 may estimate the time needed to spray a material on each layer constituting the 3D data 510 regarding the printing object. In this case, the printing time estimating part 260 may estimate the total time needed by the material spraying process by adding up the time needed to spray the materials with regard to all layers.

According to one embodiment related to the cleaning process, the printing time estimating part 260 may estimate the time needed by the cleaning process based on the total time needed by the material spraying process, the number of times the cleaning process is to be conducted per the time needed by the material spraying process, the time needed per cleaning process, and the like. For example, settings may be made in advance such that the cleaning process is performed once each time the material spraying process is performed for one minute, and each cleaning process takes thirty seconds. In this case, the printing time estimating part 260 may calculate "forty times" as the estimated time needed by the material spraying process and, on the basis thereof, may calculate "twenty minutes" as the estimated time needed by the cleaning process.

According to one embodiment related to the flattening process, the printing time estimating part 260 may estimate the time needed by the flattening process based on the 3D data 510 regarding the printing object, the time needed per flattening process, and the like. For example, settings may be made in advance such that the 3D data 510 regarding the printing object includes a total of 500 layers, and each flattening process takes 1.2 second. In this case, the printing time estimating part 260 may calculate "ten minutes" as the estimated time needed by the flattening process.

According to another embodiment, the flattening process may proceed concurrently with printing of the printing object (that is, moving and material spraying processes). In this case, the printing time estimating part 260 may not include the time needed by such a flattening process.

According to one embodiment related to the curing process, when the curing process proceeds concurrently with printing of the printing object (that is, moving and material spraying processes), the printing time estimating part 260 may not include the time needed by such a curing process. If a separate curing process is conducted after printing of the printing object is finished, the printing time estimating part 260 may calculate the predicted time based on such a separate curing process.

The printing time estimating part 260 may estimate the estimated printing time concerning the 3D data 510 regarding the printing object by adding up the time needed by each of the moving process, the material spraying process, the cleaning process, the flattening process, and the curing process.

FIG. 8 illustrates a user screen 800 displaying the result of estimating the usage amount of each material and the printing time according to one embodiment of the present disclosure. For example, the user screen 800 may be a screen output through the user output part 230. The user screen 800 may include an estimated material usage amount output area 810 and an estimated printing time output area 820. As illustrated in FIG. 8, the first output area 812 shows that the amount of first material filling the first cartridge is 3 kg, the estimated usage amount of the material is 0.199 kg, and the estimated amount of the material remaining after printing is therefore 2.801 kg. In addition, the second output area 814 shows that the amount of second material filling the second cartridge is 2.8 kg, the estimated usage amount of the material is 0.143 kg, and the estimated amount of the material remaining after printing is therefore 2.657 kg. Furthermore, the estimated printing time output area 820 shows that the estimated printing time is nine hours and five minutes.

FIG. 9 is a flowchart illustrating a method for estimating a material usage amount to be used by a 3D printer according to one embodiment of the present disclosure. At least a part of the processes illustrated in FIG. 9 may be performed by the features illustrated in FIG. 1 and FIG. 2. In relation to the processes illustrated in FIG. 9, furthermore, a part of the processes may be omitted, two or more processes may be performed simultaneously, or the order of performing the processes may be changed.

Initially, the 3D model data is loaded (S900). For example, the printing data generating part 252 loads the 3D model data from the 3D model DB 284. Next, the 3D model data is split into at least one printing area (S910). For example, the printing data generating part 252 generates the 3D data regarding a printing object based on the 3D model data, and the area splitting part 254 splits the generated 3D data regarding the printing object into at least one area formed with the same material and/or in the same printing pattern. Next, the type of the material is determined with regard to each area (S920). For example, the area-specific material determining part 256 determines the type and the printing pattern of the material formed in each area, with regard to the at least one area split by the area splitting part 254.

Next, the number of spraying times of each material for the printing area is determined (S930). For example, the material usage amount estimating part 258 determines the number of times each material is to be sprayed in each area based on the area-specific material and the printing pattern determined by the area-specific material determining part 256. Next, the material usage amount is estimated with regard to the entire printing area (S940). For example, the material usage amount estimating part 258 may estimate the material usage amount with regard to the entire area based on the number of times the material is to be sprayed in each area and the weight of each material per spraying. Next, the estimated material usage amount is output (S950). For example, the user output part 230 outputs the estimated material usage amount for the purpose of the user's confirmation.

According to a number of embodiments, furthermore, there may be additionally performed a process for estimating the usage amount of a material used to perform a printing process (for example, cleaning) of the printing object, besides the materials that constitute the printing object. In this case, the estimated usage amount may be stored in the database 280 and may be transferred to the 3D printer 10. In addition, the estimated usage amount may also be output to the user through the user output part 230 together with or separately from the estimated usage amount of the materials constituting the printing object.

Figure 10:
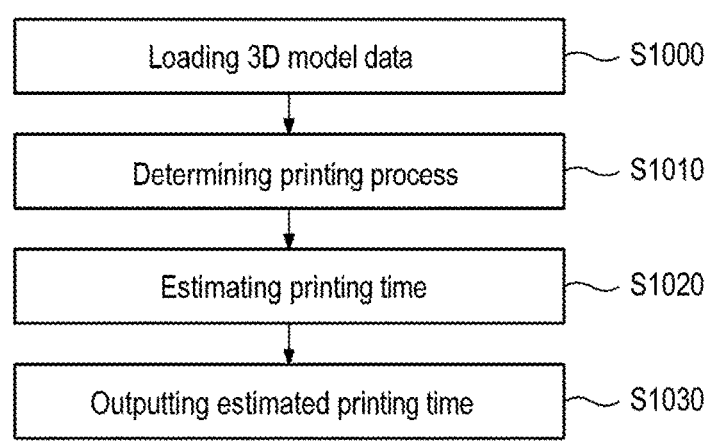
FIG. 10 is a flowchart illustrating a method for estimating printing time by a 3D printer according to one embodiment of the present disclosure.

FIG. 10 is a flowchart illustrating a method for estimating printing time by a 3D printer according to one embodiment of the present disclosure. At least a part of the processes illustrated in FIG. 10 may be performed by the features illustrated in FIG. 1 and FIG. 2. In relation to the processes illustrated in FIG. 10, furthermore, a part of the processes may be omitted, two or more processes may be performed simultaneously, or the order of performing the processes may be changed.

Initially, the 3D model data is loaded (S1000). For example, the printing process determining part 262 loads the 3D model data from the 3D model DB 284. Next, the printing process is determined (S1010). For example, the printing process determining part 262 generates the 3D data regarding a printing object based on the 3D model data stored in the 3D model DB 284, and may determine the printing process based on the generated the 3D data regarding the printing object. Next, printing time is estimated (S1020). For example, the printing time estimating part 264 may calculate the estimated time needed to perform the printing process determined by the printing process determining part 262 based on 3D printer performance data stored in the 3D printer performance DB 282. Next, the estimated printing time is output (S1030). For example, the user output part 230 outputs the estimated printing time for the purpose of the user's confirmation.

Figure 11:
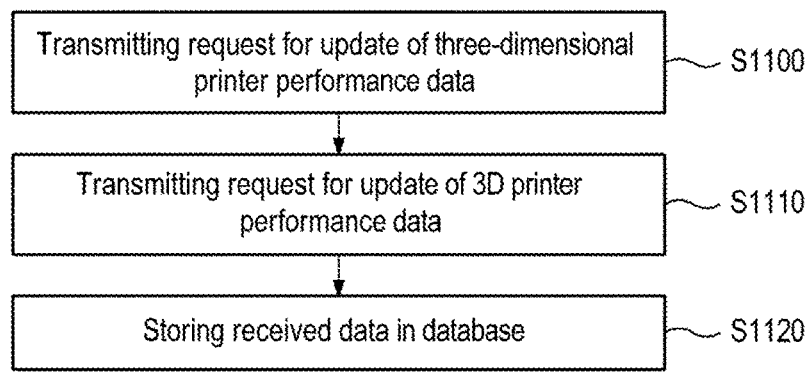
FIG. 11 is a flowchart illustrating a method for updating 3D printer performance data according to one embodiment of the present disclosure.

FIG. 11 is a flowchart illustrating a method for updating 3D printer performance data according to one embodiment of the present disclosure. At least a part of the processes illustrated in FIG. 11 may be performed by the features illustrated in FIG. 1 and FIG. 2. In relation to the processes illustrated in FIG. 11, furthermore, a part of the processes may be omitted, two or more processes may be performed simultaneously, or the order of performing the processes may be changed.

Initially, a request for update of 3D printer performance data is transmitted (S1100). For example, the data updating part 270 requests the control part 180 of the 3D printer 10 to update the performance data. Next, undated 3D printer performance data is received (S1110). For example, the data updating part 270 receives 3D printer performance data, which has been updated following software upgrade of the 3D printer 10, from the control part 180 of the 3D printer 10. Next, the received data is stored in the database (S1120). For example, the data updating part 270 stores the performance data, which has been received from the control part 180 of the 3D printer 10, in the printer performance DB 282. According to a number of embodiments, in step S1120, the process for estimating the material usage amount illustrated in FIG. 9 or the process for estimating the printing time illustrated in FIG. 10 may be performed based on the received data, instead of storing the received data in the database. The material usage amount estimating part 250 and the printing time estimating part 260 may estimate the material usage amount and the printing time more accurately based on the updated performance data.

For reference, the elements illustrated in FIG. 2 according to one embodiment of the present disclosure denote hardware elements such as a FPGA (Field Programmable Gate Array) or an ASIC (Application Specific Integrated Circuit), and perform predetermined roles.

However, "elements" are not intended to be limited to software or hardware, and each element may be configured to be stored in an addressable storage medium, or may be configured to reproduce one or more processors.

Therefore, the elements include, for example, elements such as software elements, object-oriented software elements, class elements, and task elements, processes, functions, attributes, procedures, subroutines, segments of program codes, drivers, firmware, microcodes, circuits, data, databases, data structures, tables, arrays, and variables.

Elements and functions provided within the corresponding elements may be combined into a smaller number of elements, or may be further separated into additional elements.

An embodiment of the present disclosure may also be realized as a recording medium including a computer-executable command, such as a program module executed by a computer. The computer-readable medium may be any available medium that can be accessed by a computer, and includes all volatile and non-volatile media and separable and non-separable media. The computer-readable medium may also include all computer storage media and communication media. The computer storage media include all volatile and non-volatile media and separable and non-separable media realized by any method or technology for storing information such as computer-readable commands, data structures, program modules, or other types of data. The communication media typically include computer-readable commands, data structures, program modules, other types of data regarding modulated data signals, such as carrier waves, or other transmission mechanisms, and include any information delivery media.

According to various embodiments of the present disclosure, the 3D shape of a printing object to be printed by a 3D printer can be split into at least one area formed with the same material and/or in the same printing pattern, and the usage amount of each material can be estimated with regard to each split area and then added up. Therefore, it is possible to efficiently conduct estimation of the material usage amount by the 3D printer.

In addition, according to various embodiments of the present disclosure, the time needed to print the printing object can be estimated efficiently and accurately using 3D printer performance information.

The above description of the present disclosure has been presented by way of example only, and a person skilled in the art to which the present disclosure pertains could understand that the description may be embodied in a variety of other forms without changing the technical idea or essential feature of the present disclosure. Therefore, above-described embodiments are to be understood as illustrative in all aspects, not limiting in any sense. For example, each element described as a single form may be implemented in a distributed manner, and elements described as distributed forms may likewise be implemented in a combined type.

The scope of the present disclosure is to be interpreted as defined by the following claims, not by the detailed description given above, and as including all modifications or modified forms derived from the meaning, scope, and equivalent concept of the claims.

What is claimed is:

1. A three-dimensional (3D) printing estimation apparatus for estimating information regarding a 3D printing operation by a 3D printer, comprising:
a database configured to store 3D model data indicating a printing part and usage amount information of each material in one spraying process;
a printing data generating part configured to generate 3D data of a printing object including the printing part and a support based on the 3D model data;
an area splitting part configured to split the 3D data into at least one area;
a material determining part configured to determine a type and a printing pattern of each material constituting each of the at least one area; and
a material usage amount estimating part configured to determine a number of times each material is sprayed on the at least one area based on the determined type and the printing pattern of each material, and to estimate a usage amount of each material needed to print the printing object based on the determined number of times each material is sprayed and the usage amount information of each material in one spraying process.

2. The apparatus of claim 1, wherein the printing data generating part is configured to generate the 3D data based on at least one selected from a group consisting of a structure, a shape, and a volume of the printing part.

3. The apparatus of claim 1, wherein the area splitting part is configured to split the 3D data into the at least one area based on at least one selected from a group consisting of a structure, a shape, and a volume of the printing object.

4. The apparatus of claim 1, wherein the material determining part is configured to determine the type and the printing pattern of each material for each of the at least one area based on at least one selected from a group consisting of a structure, a shape, a volume, and a position of the area.

5. The apparatus of claim 1, wherein the database is configured to further store performance data regarding the 3D printer, and
wherein the apparatus further comprises:
a printing process determining part configured to determine a printing process for printing the printing object, the printing process including at least one selected from a group consisting of a moving process, a material spraying process, a cleaning process, a flattening process, and a curing process; and
a printing time estimating part configured to estimate a printing time needed to perform the printing process based on the performance data regarding the 3D printer.

6. The apparatus of claim 5, wherein the database is configured to further store usage amount information of a cleaning material in one cleaning process, and
wherein the material usage amount estimating part is configured to determine a number of times the cleaning process is performed based on a spraying time needed to perform the material spraying process, and to estimate a usage amount of the cleaning material needed to print the printing object based on the determined number of times the cleaning process is performed and the usage amount information of the cleaning material in one cleaning process.

7. The apparatus of claim 1, further comprising a display configured to output the estimated usage amount of each material.

8. An estimation method for estimating information regarding a 3D printing operation by a 3D printer, comprising:
generating, by a 3D printing estimation apparatus, 3D data of a printing object including a printing part and a support based on 3D model data indicating the printing part;
splitting, by the 3D printing estimation apparatus, the 3D data into at least one area;
determining, by the 3D printing estimation apparatus, a type and a printing pattern of each material constituting each of the at least one area;
determining, by the 3D printing estimation apparatus, a number of times each material is sprayed on the at least one area based on the determined type and the printing pattern of each material; and
estimating, by the 3D printing estimation apparatus, a usage amount of each material needed to print the printing object based on the determined number of times each material is sprayed and usage amount information of each material in one spraying process.

9. The method of claim 8, wherein generating the 3D data includes generating the 3D data based on at least one selected from a group consisting of a structure, a shape, and a volume of the printing part.

10. The method of claim 8, wherein splitting the 3D data includes splitting the 3D data into the at least one area based on at least one selected from a group consisting of a structure, a shape, and a volume of the printing object.

11. The method of claim 8, wherein determining the type and the printing pattern of each material includes determining the type and the printing pattern of each material for each of the at least one area based on at least one selected from a group consisting of a structure, a shape, a volume, and a position of the area.

12. The method of claim 8, further comprising:
determining, by the 3D printing estimation apparatus, a printing process for printing the printing object, the printing process including at least one selected from a group consisting of a moving process, a material spraying process, a cleaning process, a flattening process, and a curing process; and
estimating, by the 3D printing estimation apparatus, a printing time needed to perform the printing process based on performance data regarding the 3D printer.

13. The method of claim 12, wherein estimating the usage amount of each material includes:
determining a number of times the cleaning process is performed based on a spraying time needed to perform the material spraying process; and
estimating a usage amount of a cleaning material needed to print the printing object based on the determined number of times the cleaning process is performed and usage amount information of the cleaning material in one cleaning process.

14. The method of claim 8, further comprising outputting, by the 3D printing estimation apparatus, the estimated usage amount of each material.

15. The method of claim 8, further comprising receiving, by the 3D printing estimation apparatus, the usage amount information of each material per spraying from the 3D printer.

16. The method of claim 8, further comprising:
transferring, by the 3D printing estimation apparatus, a request for updating the usage amount information of each material per spraying to the 3D printer; and receiving, by the 3D printing estimation apparatus, updated usage amount information of each material per spraying from the 3D printer, wherein the act of estimating the usage amount of each material is performed based on the updated usage amount information.

* * * * *